Aug. 28, 1951     T. P. WILLIAMS     2,566,011
METHOD OF BRAZING AND REMOVING
EXCESS BRAZING MATERIAL
Filed Dec. 17, 1945

INVENTOR
THOMAS PAUL WILLIAMS
BY
Spencer, Hardman + Fehr
ATTORNEYS

Patented Aug. 28, 1951

2,566,011

UNITED STATES PATENT OFFICE 2,566,011

METHOD OF BRAZING AND REMOVING EXCESS BRAZING MATERIAL

Thomas Paul Williams, Dayton, Ohio, assignor to General Motors Corporation, Detroit, Mich., a corporation of Delaware Application December 17, 1945, Serial No. 635,453

2 Claims. (Cl. 113—112)

This invention relates to a means and method of uniting by bonding pieces of ferrous metal such as the steel parts of a hollow propeller blade. It has been found that an excess of bonding metal tends to weaken the strength of a bonded joint to such an extent that parts united under those conditions may fail when subjected to severe strains or repeated stress. In uniting members to form a hollow structure, such as a hollow propelled blade, the excess bonding material during the process of heating for bonding will drain to the low point of the hollow chamber where it collects in a puddle, or so unites with the structural member as to lower the fatigue strength and cause failure of the structural member. In the case of copper as a bonding metal with steel as the structural material, the copper so alloys with the steel at the puddle point as to be impractical of segregation by physical means, except for persistent grinding and filing and the like. In the case of many hollow structures, the puddle point of bond-excess deposit is so far removed from an opening into the hollow structure, that the manipulation of tools for removal of the excess after completion of the bonding cycle is extremely difficult if not impossible.

It is therefore an object of this invention to effect a bonded joint between ferrous members with a minimum of excess bonding material remaining on the bonded members or in the bonded joint.

Another object of the invention is to provide a collecting unit for excess bonding metal, which unit can be removed at the conclusion of the bonding cycle.

Another object of the invention is to provide a method of bonding hollow ferrous articles that will result in the use of a minimum of bonding material, and leave no deposits of excess bonding material.

A specific object of the invention is to provide a means and method for uniting steel members of a hollow propeller blade by copper brazing during a heating cycle, and collecting the excess of copper beyond what is needed for the brazed joints at a predetermined point of the assembly, and removing the collected excess of copper through the hollow root of the completed blade at the conclusion of the brazing cycle.

Further objects and advantages of the present invention will be apparent from the following description, reference being had to the accompanying drawings wherein a preferred embodiment of the present invention is clearly shown.

Figure 1:
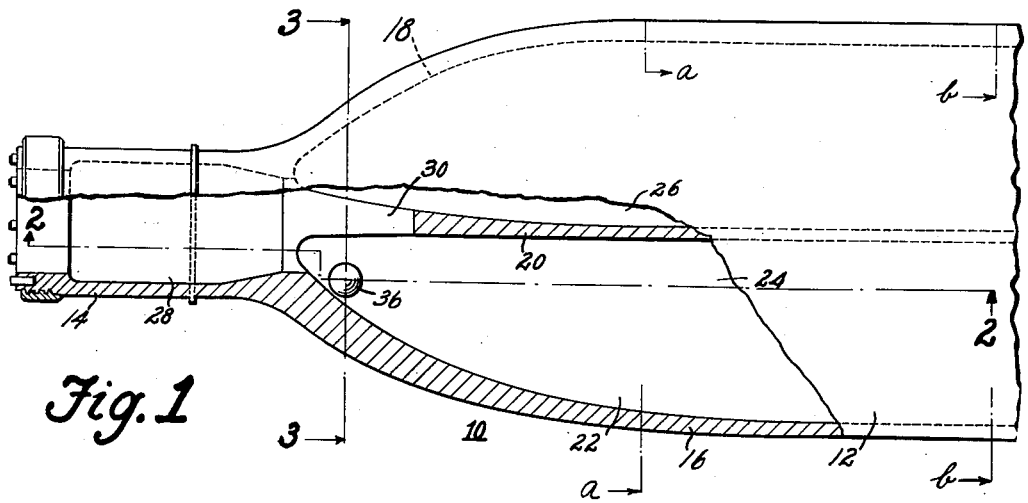
Fig. 1 is a view of a hollow propeller blade in plan form with parts broken away and shown in section to illustrate the invention.

While the invention is illustrated in connection with the bonding of component ferrous parts by copper to form a hollow steel propeller blade, it is obvious that the means and method may be used in the uniting of other members to form blades, and is also applicable to uniting of parts for the manufacture of other structures than hollow propeller blades. In its broadest aspect the means and method are applicable to the forming of hollow structures where there is a low point of the cavity formed by the component parts to which the excess of bonding material may drain.

The foregoing objects of the invention are assured by arranging the component members of the structure with the necessary bonding material in such position that the hollow chamber or cavity formed by the component members affords a low point to which molten metal may drain. A collecting body for the molten metal is then placed at the low point, and the loose assembly processed for bonding, after which the collecting body is removed. This is preferably accomplished by placing the loose assembly between jigs or clamp members susceptible of clamping or pressure application to the loose assembly. At the low point of the chamber there is placed a porous body of material having affinity for the bond material to be used. Such body or collector is preferably in the form of a sphere, ball, rounded object or of such other physical form as to have a minimum area of engagement with the structural member at the low point of the cavity. A ball is the preferred form of body, but a cylinder has been used to good advantage. The body or collector should be porous and of such structure as to combine readily with the bonding material. The whole assembly is then placed in an oven or other heating means where the bonding cycle is completed, during which the bond material is melted, caused to unite the structural components into a single unit with the excess of bond material draining to the low point of the cavity where it is taken up by the porous collecting body. At the conclusion of the bonding cycle, the body is chipped loose and removed through the opening provided, thus removing all of the excess bonding material in a single solid mass.

As the invention is practiced in one specific instance, reference is now made to the drawings in which 10 refers to a hollow steel propeller blade, in which a forged steel thrust member 12 has a root end 14 joining a plate portion formed with an integral leading edge rib 16, a trailing edge rib 18 and a mid rib 20. To the surface of the ribs there is attached a camber sheet 22 having bonded engagement by copper brazing that holds the parts together. That construction divides the interior of the blade into a pair of chambers 24 and 26 extending from the root 14 to the tip of the blade, the chambers being separated by the mid rib 20. The root of the blade is bored, drilled or otherwise hollowed out at 28 and far enough along the axis thereof to cut away the near end portion of the mid rib 20 as indicated at 30, so as to give access to the interior of both blade chambers for the application of anti-rust coating, and for dinging out any irregularities in surface that result from subsequent processes or that may thereafter develop.

Figure 4:
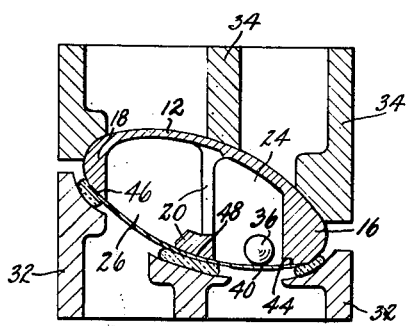
Fig. 4 is a similar section, including a section through holding fixtures for the blade parts during the bonding cycle.

In the bonding process, the contiguous portions of the ribs on the thrust member and the camber sheets are usually coated, or sprayed with, or adjusted into contact with a layer of the bonding material, and the loose assembly is then placed in clamp fixtures preparatory to oven heating. One form of process found to be satisfactory is to spray the engaging surfaces of the joint with copper, then lay the camber sheet in the lower clamp fixture 32 substantially as shown in Fig. 4 and so that the inside of the camber sheet is uppermost with the length of the sheet inclining upwardly toward the tip end. The thrust member, which has also been sprayed with copper on the surface of the ribs, is then turned with the ribs downwardly and fitted into place over the camber sheet. Another method is to place the camber sheet with uncoated edges in the clamp fixture with the hollowed side up and then lay over the areas of the camber sheet to be bonded to the thrust member a thin copper foil or strip that will afford sufficient copper for the bond. That is followed by the thrust member with the ribs downwardly, the surfaces of the ribs not being coated. In either event when the loose assembly of blade elements are adjusted within the lower clamp member 32 the top clamp member 34 is placed in position and initially buckled down or clamped toward the bottom clamp member 32. That may be accomplished in any one of several ways, such as screw clamps or cam clamps or automatically operating clamps, or by affixing weights of selected mass on the upper clamp member.

At some point in the process of assembling of the blade parts and clamp fixture, a collecting body 36 is placed in the blade cavity. It is more convenient to place the collector at the low point just after the camber sheet has been adjusted to position on the lower clamp member. If the collector is spherical it can be dropped into place and it will automatically seek the low point of the cavity. Much the same is true with respect to a cylindrical body, and no special consideration need be given to its exact location. On the other hand, the collecting body may be before the loaded fixture goes into the oven or heating means. Both the spherical and cylindrical form of collector has been placed in position even after the blade parts were clamped in the fixtures. That was easily accomplished by poking it through the opening 28 of the root and cutaway portion 30 of the mid rib into one of the lower chambers of the blade.

The collecting body has high porosity characteristics, and is constructed from material that has an affinity for the bonding material to be used. A collecting body of ferrous material in the neighborhood of about 1 cu. inch serves for practically all purposes, and for the greatest range of bonding materials. A collecting body formed from powdered or sintered iron has been found to be capable of taking up a relatively great volume of bonding material. Tightly compacted steel wool has also been used with success. One of the principal requisites of the collecting body is that it shall have sufficient porosity to act in a capillary manner to soak up the molten bonding material that comes in contact with it. When the ferrous collector is used in conjunction with silver solders, or in the presence of copper manganese, it has been found advisable to coat the collecting body with an appropriate flux to such an extent as to increase the wetting qualities for the particular material to be taken up.

Figure 2:
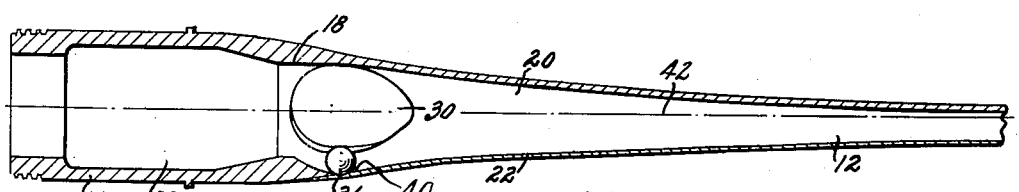
Fig. 2 is a longitudinal section through the blade substantially as shown by the line and arrows 2—2 of Fig. 1.
Figure 3:
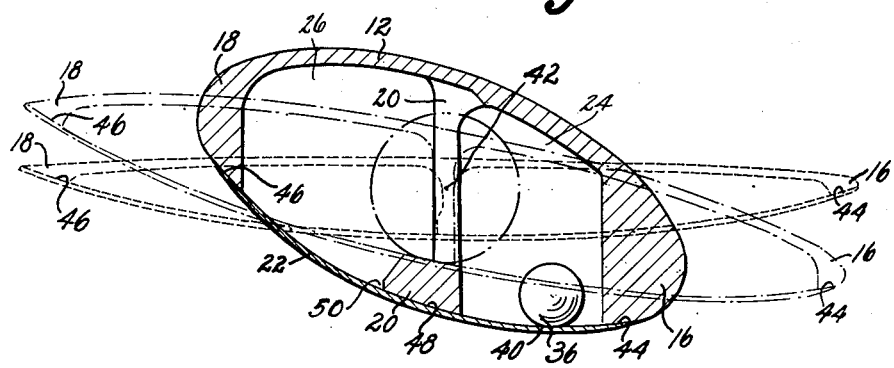
Fig. 3 is an enlarged section of the blade substantially as indicated by the line and arrows 3—3 of Fig. 1.

When the assembly of blade parts, clamp fixture and collector are all in preparation they are placed in the brazing furnace where they are heated to the proper temperature for a proper time. During this brazing cycle the copper entering into the bond is melted and the pressure applied by the clamp fixture squeezes out all but that needed for the bond. The excess of that needed for the bond drains toward the low point 40 of the hollow assembly as can be seen by reference to Figs. 2 and 3. It will there be seen that though the axis 42 of the blade is maintained perfectly horizontal, that the inside surface of the camber member slopes from the tip or right hand end as shown in Fig. 2 to the left or toward the root end 14. In Fig. 3 there is superposed over the solid section taken through the blade at 3—3 of Fig. 1, two phantom sections through the blade at spaced distances toward the tip end of the blade. Those phantom sections are the dot and dash section generally indicated at the line and arrows a—a of Fig. 1, while the short dash section is generally indicated at the line and arrows b—b of Fig. 1. It can there be seen that the surface of the camber sheet gets lower and lower as it approaches the section 3—3.

In those views the references 44, 46 and 48 refer to the bonds between the camber sheet and the faces of the ribs 16, 18 and 20. Close scrutiny of Fig. 3 might lead one to think that the draining of excess bonding material from the bond 46 at the left edge of the view to the low point 40 would be interrupted and prevented by the mid rib 20 and its bond 48. However, such is not the case. The excess of bonding material from the bond 46 will drain toward the mid rib 20 and seep through the bond 48 and thence to the low point 40 where it is taken up by the collecting body 36. There will be no deposit or excess of bonding material along the high side of the mid rib juncture as might be expected to obtain at the point 50 in Fig. 3. It has been found that all excess of bonding material drains to the single low point 40. It therefore becomes sufficient to make use of a single collector body located at the lowest point of the cavity, even though there are remotely situated cavities, for collecting all of the excess bonding material.

In devices comparable with propeller blades, it is necessary that they be carefully balanced or proportioned with respect to certain reference points. In a propeller blade it may be with respect to the pitch axis 42. Because of that it is necessary to remove any excess of bonding material. Prior to the occurrence of the instant invention it was necessary to remove the excess bonding material collecting at the low point 43 by chiseling, grinding, filing, rasping or chipping small parts at a time and which could only be accomplished by the use of special tools manipulated through the passage 28 of the blade root. The removal was difficult, time consuming and always imperfectly done. The present development makes it possible to remove all of the excess of bonding material in a single mass, by chipping loose the collector body with its load and removing through the root bore. In those structures where balance is of no moment, it may not be necessary to remove the collected excess. Such an instance might be in a fuel storage tank or the receptacle of a tank car.

While the embodiment of the present invention, as herein disclosed, constitutes a preferred form, it is to be understood that other forms might be adopted, all coming within the scope of the claims which follow.

What is claimed is as follows:

1. The method of bonding metal bodies by layers of dissimilar bonding material at contiguous surfaces into a chambered construction, which comprises the steps of adjusting the bodies with an excess of raw bonding material between them into their relative positions to be bonded and so that the bodies provide a low point of the chamber toward which all body surfaces slope downwardly, disposing a porous collector body at the said low point, said collector body having an affinity for the bonding material and adapted to collect by capillary attraction any molten bonding material coming in contact therewith, and having a contour presenting a relative small area contacting the body of the chamber as respects the volumetric content of the collector body, cycling the adjusted bodies and collector through bonding by which the bonding material is melted and combined with the metal bodies, the excess of melted bonding material over that needed for the bond draining to the said low point for collection by the collector body, and removing the collector body at the completion of the bonding cycle.

2. The method of bonding metal bodies by layers of dissimilar bonding material at contiguous surfaces into a chambered construction, which comprises the steps of adjusting the bodies with an excess of raw bonding material between them into their relative positions to be bonded and so that the bodies provide a low point of the chamber situate below any mutually contacting surfaces of bodies and bonding material from which molten bonding material may flow to said low point, disposing a porous collector body at the said low point for collecting the molten bonding material flowing thereto, said collector body having an affinity for the bonding material and being characterised by a curved contour engaging the low point of the chamber to provide a reduced area of engagement therewith, processing the adjusted bodies and collector for melting the bond material and bonding of the contiguous surfaces and for draining the excess of bonding material to the low point, thence removing the collector body and its collected load of excess bonding material.

THOMAS PAUL WILLIAMS.

REFERENCES CITED

The following references are of record in the file of this patent:

UNITED STATES PATENTS

| Number | Name | Date |
| --- | --- | --- |
| 2,145,168 | Flagg | Jan. 24, 1939 |
| 2,231,888 | Couch | Feb. 18, 1941 |
| 2,331,689 | Hodge | Oct. 12, 1943 |
| 2,365,562 | Koehring | Dec. 19, 1944 |
| 2,401,483 | Hensel | July 4, 1946 |